(12) United States Patent
Okawa

(10) Patent No.: US 9,998,738 B2
(45) Date of Patent: Jun. 12, 2018

(54) IMAGE ENCODING APPARATUS, IMAGE ENCODING METHOD AND STORAGE MEDIUM

(71) Applicant: CANON KABUSHIKI KAISHA, Tokyo (JP)

(72) Inventor: Koji Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 14/565,177

(22) Filed: Dec. 9, 2014

(65) Prior Publication Data

US 2015/0163492 A1 Jun. 11, 2015

(30) Foreign Application Priority Data

Dec. 11, 2013 (JP) .................................. 2013-255671

(51) Int. Cl.
*H04N 19/124* (2014.01)
*H04N 19/176* (2014.01)
*H04N 19/14* (2014.01)

(52) U.S. Cl.
CPC .......... *H04N 19/124* (2014.11); *H04N 19/14* (2014.11); *H04N 19/176* (2014.11)

(58) Field of Classification Search
CPC .. H04N 19/124; H04N 19/136; H04N 19/137; H04N 19/14; H04N 19/176
See application file for complete search history.

(56) References Cited

U.S. PATENT DOCUMENTS

| 9,571,828 B2* | 2/2017 | Okawa | H04N 19/176 |
| 2004/0081236 A1* | 4/2004 | Seo | H04N 19/176 375/240.03 |
| 2010/0098173 A1* | 4/2010 | Horiuchi | H04N 19/176 375/240.18 |
| 2010/0189183 A1* | 7/2010 | Gu | H04N 21/23439 375/240.28 |

(Continued)

FOREIGN PATENT DOCUMENTS

| JP | H04-268891 A | 9/1992 |
| JP | 2009-200871 A | 9/2009 |

OTHER PUBLICATIONS

International Telecommunication Union, "Advanced video coding for generic audiovisual services", (Mar. 2010), ITU-T Telecommunication Standardization Sector of ITU H.264, pp. 1-676. In particular pp. 103 and 104.

*Primary Examiner* — Anner N Holder
(74) *Attorney, Agent, or Firm* — Canon USA, Inc. I.P. Division

(57) ABSTRACT

An image encoding apparatus which encodes an image includes a first acquiring unit configured to acquire an evaluation value for a block being a division of the image, a determining unit configured to determine a class to which the block belongs to among a plurality of classes based on the evaluation value acquired by the first acquiring unit, a second acquiring unit configured to acquire count information describing the number of blocks belonging to a predetermined class of the plurality of classes, and a setting unit configured to set a quantization parameter usable for encoding a block belonging to a different class from the predetermined class based on the count information acquired by the second acquiring unit.

24 Claims, 8 Drawing Sheets

(56) References Cited

U.S. PATENT DOCUMENTS

| | | | |
|---|---|---|---|
| 2011/0075730 A1* | 3/2011 | Samuelsson | H04N 19/139 |
| | | | 375/240.03 |
| 2011/0164677 A1* | 7/2011 | Lu | H04N 19/176 |
| | | | 375/240.02 |
| 2012/0269258 A1* | 10/2012 | Yang | H04N 19/00163 |
| | | | 375/240.02 |
| 2013/0215966 A1* | 8/2013 | Miyoshi | H04N 19/00569 |
| | | | 375/240.15 |

* cited by examiner

FIG. 5

| NUMBER OF BLOCKS BELONGING TO CLASS FOR UNREMARKABLE DETERIORATION OF IMAGE QUALITY | CLASS QUANTIZATION PARAMETER FOR CLASS FOR REMARKABLE DETERIORATION OF IMAGE QUALITY | CLASS QUANTIZATION PARAMETER FOR CLASS FOR UNREMARKABLE DETERIORATION OF IMAGE QUALITY |
|---|---|---|
| LOWER THAN 1% | ±0 | +4 |
| EQUAL TO OR HIGHER THAN 1% AND LOWER THAN 5% | ±0 TO -2 | +4 |
| EQUAL TO OR HIGHER THAN 5% AND LOWER THAN 10% | -1 TO -4 | +4 |
| EQUAL TO OR HIGHER THAN 10% AND LOWER THAN 20% | -2 TO -5 | +4 |
| 20% OR HIGHER | -3 TO -6 | +4 |

FIG. 7

| CLASS | CONDITION |
|---|---|
| R1 | C1 < T1[1] AND C2 < T2[1] |
| R2 | C1 < T1[2] AND C2 < T2[3] |
| R3 | C1 < T1[3] AND C2 < T2[1] |
| R4 | C1 < T1[4] AND C2 < T2[1] |
| R5 | C1 < T1[6] AND C2 < T2[1] |
| R6 | C1 < T1[6] AND C2 < T2[3] |
| R7 | C1 < T1[7] AND C2 < T2[4] |
| R8 | C1 < T1[5] AND C2 < T2[5] |
| R9 | C1 < T1[8] AND C2 < T2[6] |
| R10 | C1 < T1[8] AND C2 < T2[7] |
| R11 | C1 < T1[9] AND C2 < T2[6] |
| R12 | C1 < T1[9] AND C2 < T2[7] |
| R13 | C1 < T1[9] AND C2 < T2[8] |

IMAGE ENCODING APPARATUS, IMAGE ENCODING METHOD AND STORAGE MEDIUM

BACKGROUND OF THE INVENTION

Field of the Invention

The present invention relates to an image encoding apparatus, an image encoding method and a storage medium, and it particularly relates to an adaptive control over an amount of code within a frame.

Description of the Related Art

H.264/MPEG-4 AVC (hereinafter, H.264) has been known as an encoding scheme usable for compressing and recording a moving image. (ITU-T H.264 (March 2010) Advanced video coding for generic audiovisual services) When H.264 is used to encode an image in blocks, the quantization value is variable for each block. Controlling the quantization value in blocks allows control of the amount of code to be assigned to each block and thus control over image quality of each block.

In the past, when such an encoding scheme is used to encode an image, an increase of the amount of code may be inhibited while inhibiting degradation of image quality by controlling the amount of code in the following manner. That is, blocks of images in one frame are classified based on the visual characteristic of human beings, and a lower value than a reference quantization value is assigned as a quantization value for a block belonging to a class for remarkable degradation of image quality in the visual characteristic of human beings to inhibit degradation of image quality. Here, such a reference quantization value may be a frame QP or a slice QP, for example.

On the other hand, a higher value than the reference quantization value may be assigned as a quantization value for a block belonging to a class for unremarkable degradation of image quality to inhibit an increase of the amount of code of the block belonging to the class. However, according to the method in the past, when the number of blocks belonging to a class for remarkable degradation of image quality increases in one frame, a lower quantization value than the reference quantization value is assigned to more blocks, which disadvantageously increases the amount of code in one frame. Against this, the quantization value to be assigned to the blocks must be controlled in consideration of the number of blocks belonging to the classes.

For example, a technology in the past divides one frame into 16×16 pixel blocks based on the visual characteristic of human beings, and the 16×16 pixel encoded blocks are classified (into a class A). Then, a reference quantization value is provided for each of the classes A. Each of 8×8 pixel blocks (sub-blocks) is classified into a class B based on a variance value for the 8×8 pixel blocks. Thus, a histogram of the number of blocks of the class A and class B is generated. A generated bit amount for each frame is predicted based on the histogram and the reference quantization value, and the reference quantization value for each class is adjusted based on the predicted bit amount.

However, the technology in the past must determine a quantization value to be assigned to each class in consideration of the number of blocks belonging to all classes in each frame in order to predict the generated bit amount for the frame. Thus, an increased number of bits may be required for determining a quantization value in consideration of the number of blocks belonging to all classes for one frame according to the technology in the past. This may increase the computational cost for predicting the generated bit amount for one frame.

SUMMARY OF THE INVENTION

The present invention provides an image encoding apparatus which encodes an image in blocks, the apparatus including a first acquiring unit configured to acquire an evaluation value for a block, a determining unit configured to determine a class to which the block belongs to among a plurality of classes based on the evaluation value acquired by the first acquiring unit, a second acquiring unit configured to acquire count information describing the number of blocks belonging to a predetermined class of the plurality of classes, and a setting unit configured to set a quantization parameter usable for encoding a block belonging to a different class from the predetermined class based on the count information acquired by the second acquiring unit.

Further features of the present invention will become apparent from the following description of exemplary embodiments with reference to the attached drawings.

An appropriate amount of code may be assigned to each block based on the visual characteristic of human beings so that degradation of image quality may be inhibited while inhibiting an increase of the amount of code. A quantization value to be assigned to each block may be controlled based on the number of blocks belonging to a class for remarkable degradation of image quality so that the number of memory bits and computational cost required for the quantization value control may be reduced compared with a case where the number of blocks belonging to all classes within a frame are counted.

BRIEF DESCRIPTION OF THE DRAWINGS

FIG. 5 illustrates a method for setting a quantization parameter according to the first exemplary embodiment.

FIG. 7 illustrates relationships between classes and evaluation values according to the second exemplary embodiment.

DESCRIPTION OF THE EMBODIMENTS

The present invention will be described below in detail based on exemplary embodiments with reference to the attached drawings. Configurations are given in the following descriptions for illustration purpose only, and the present invention is not limited to the illustrated configurations.

First Exemplary Embodiment

Figure 1:
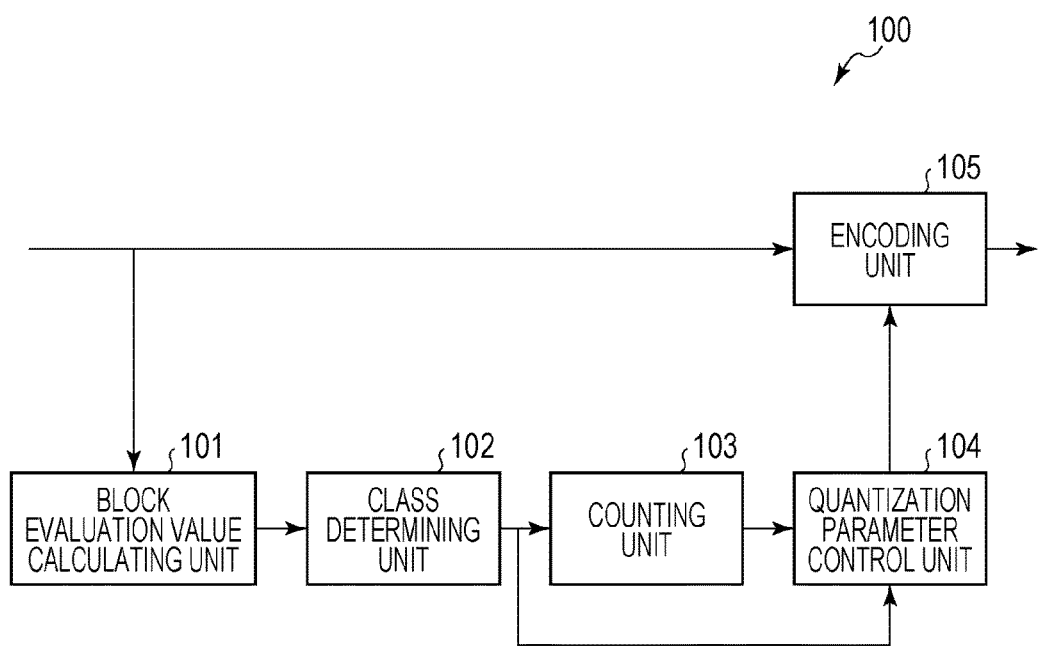
FIG. 1 illustrates a configuration of an image encoding apparatus according to first exemplary embodiment.

A first exemplary embodiment will be described below with reference to drawings. FIG. 1 illustrates a configuration of an image encoding apparatus 100 according to this exemplary embodiment.

Referring to FIG. 1, a block evaluation value calculating unit 101 is configured to calculate an evaluation value usable for evaluation of each block of an input image (hereinafter, called block evaluation value). That is, the block evaluation value calculating unit 101 receives an image in blocks from the image encoding apparatus 100 and calculates a block evaluation value for each of the blocks. The block evaluation value will be described below. A class determining unit 102 is configured to determine a class to which a block belongs based on the block evaluation value calculated by the block evaluation value calculating unit 101. Here, the class is a category based on the degree of influence on the human vision (visual characteristic). For example, a class according to this exemplary embodiment may refer to a category based on the degree of degradation of image quality (degree of remarkable/unremarkable degradation of image quality). The class may refer to a rank based on the visual characteristic (degree of degradation of image quality). For example, classes may be provided so as to indicate that a region R1 among regions R1 to R13 illustrated in FIG. 6 and FIG. 7 has the highest degree of degradation of image quality while the region R13 has the lowest degree of degradation of image quality. Hereinafter, information describing a class to which a block belongs will be called class information. A counting unit 103 is configured to count the number of blocks belonging to each class based on class information input from the class determining unit 102. Hereinafter, information describing the number of blocks belonging to each class will be called count information.

A quantization parameter control unit 104 is configured to control a quantization parameter for a block to be encoded (hereinafter, called encoding target block). The quantization parameter control unit 104 acquires count information from the counting unit 103 and determines a class quantization parameter which is a quantization parameter to be assigned to a class. The quantization parameter control unit 104 further generates a quantization parameter for the encoding target block based on the class quantization parameter for the encoding target block and class information on the encoding target block determined by the class determining unit 102. Hereinafter, a quantization parameter for a block will be called a block quantization parameter. An encoding unit 105 is configured to encode the encoding target block based on a block quantization parameter input from the quantization parameter control unit 104.

Next, operations to be performed by the image encoding apparatus 100 according to this exemplary embodiment will be described in detail with reference to a flowchart in FIG. 2. The image encoding apparatus 100 according to this exemplary embodiment receives a moving image in frames and processes the moving image in blocks being divisions of each of the frames in raster order.

First in step S201, the counting unit 103 initializes the count information to 0. Next, in step S202, the block evaluation value calculating unit 101 calculates a block evaluation value for an input block. It is assumed here that the block evaluation value relates to an image quality index for a block to be processed (hereinafter, called a processing target block) in a case where the processing target block is encoded. The image quality index refers to a value relating to a degree of an influence of a quantization error which will occur when the image is encoded on human vision (visual characteristic). The counting unit 103 according to this exemplary embodiment calculates a mean value of luminance and complexities of luminance of pixels belonging to the processing target block as block evaluation values.

Next, how the block evaluation value calculating unit 101 calculates the complexities of luminance as a block evaluation value will be described more specifically. First, the block evaluation value calculating unit 101 divides the processing target block into a plurality of 4×4 pixel sub-blocks and calculates a total value of magnitudes (absolute values) of the differences between the luminance values of pixels belonging to the sub-block and the mean value of luminance as a complexity of the sub-block. The block evaluation value calculating unit 101 calculates the complexities of all sub-blocks within the processing target block and then defines a minimum value of the calculated complexities of the sub-blocks as a complexity of luminance to be used as a block evaluation value.

According to this exemplary embodiment, a minimum value of 4×4 pixel sub-blocks is used to calculate the complexity. However, the block size of the sub-blocks is not limited thereto but may be 8×8 pixel sub-blocks. Alternatively, a 16×16 pixel processing target block may be used as it is. According to this exemplary embodiment, a minimum value of sub-blocks is used to calculate the complexity. However, a mean value or a maximum value may be used instead of the minimum value.

Figure 2:
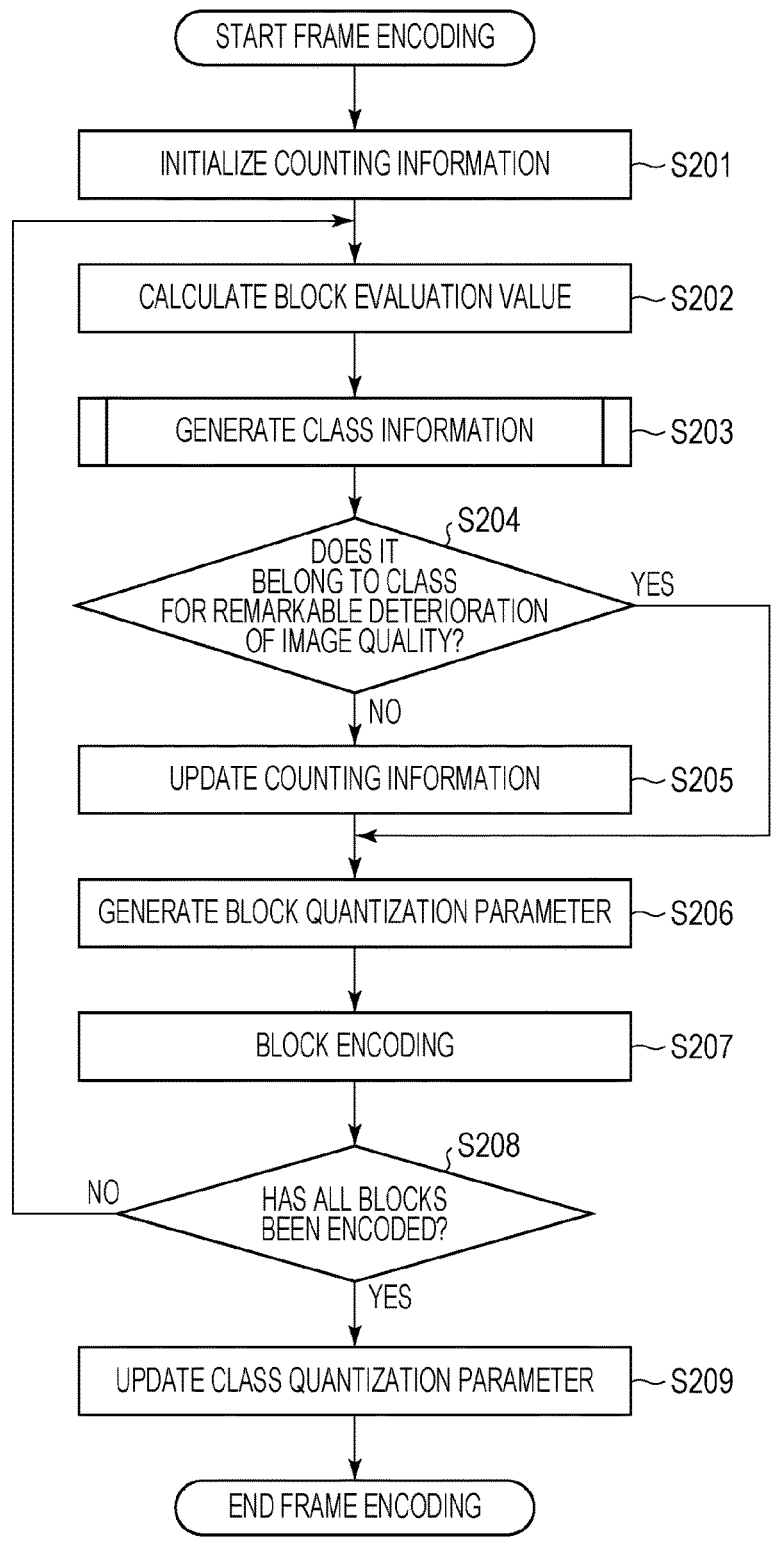
FIG. 2 is a flowchart of frame encoding according to the first exemplary embodiment.

Next, processing in and after step S203 in FIG. 2 will be descried. In step S203, the class determining unit 102 generates class information corresponding to the processing target block based on the block evaluation value calculated in step S202. According to this exemplary embodiment, the mean value of luminance of a processing target block is defined as an evaluation value C1, and a complexity of luminance is defined as an evaluation value C2 so that class information may be generated based on the two block evaluation values of the evaluation value C1 and the evaluation value C2. A threshold value array T1 and a threshold value array T2 are defined for the evaluation value C1 and evaluation value C2, respectively. While two block evaluation values are used according to this exemplary embodiment, an embodiment of the present invention is not limited thereto. In a case where k block evaluation values are used, threshold value arrays Tk are individually held for k evaluation values C1, C2, . . . and Ck.

Figure 4:
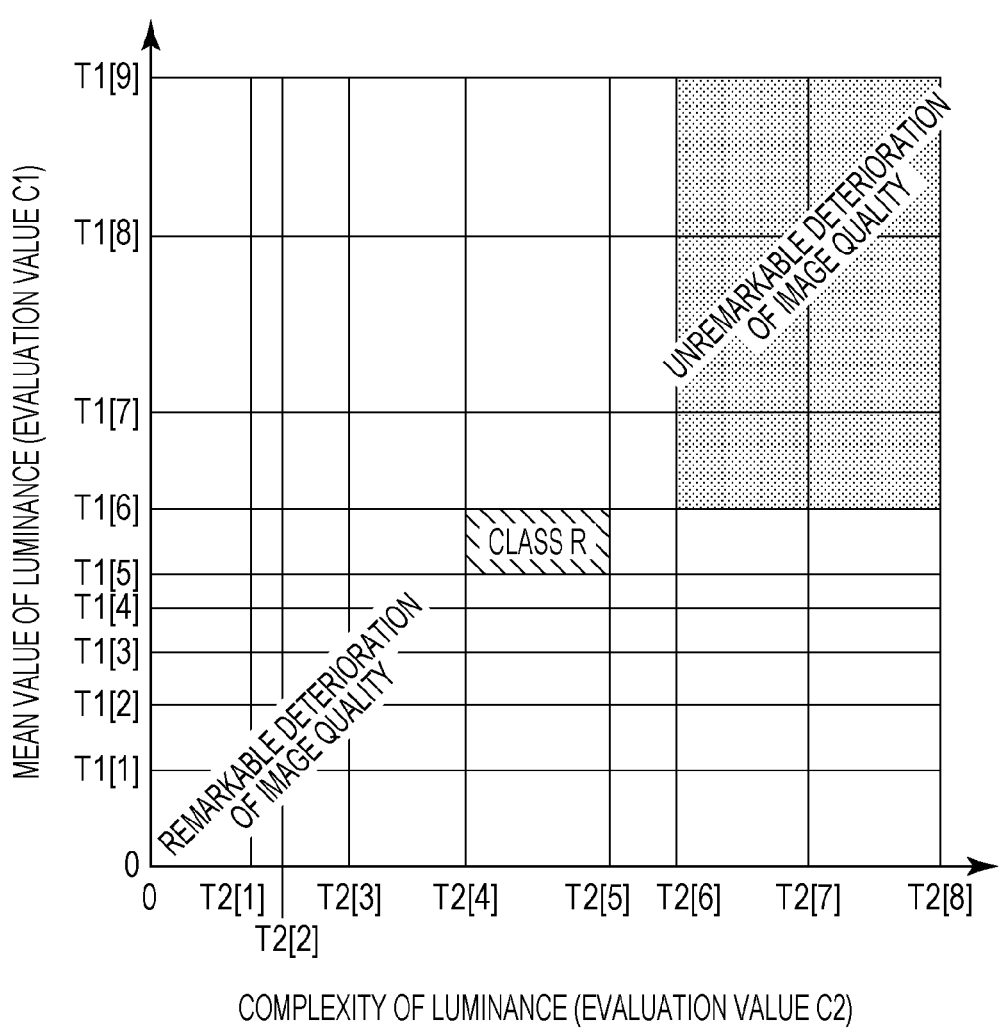
FIG. 4 illustrates identification of a class according to the first exemplary embodiment.

FIG. 4 illustrates an example of an identification of a processing target block in a case where a mean value of luminance and a complexity of luminance are used as block evaluation values. The horizontal axis indicates complexity of luminance (evaluation value C2), and the vertical axis indicates a mean value of luminance (evaluation value C1), and a total of 72 classes are provided. The threshold value array T1 and threshold value array T2 include a pair of threshold values that define each class. In the example in FIG. 4, a threshold value array T1={T1[1], T1[2], T1[3], T1[4], T1[5], T1[6], T1[7], T1[8], T1[9]} is provided. A threshold value array T2={T2[1], T2[2], T2[3], T2[4], T2[5], T2[6], T2[7], T2[8]} is provided. An element of the threshold value array Ti with the evaluation value Ci is expressed as a threshold value Ti[j].

The class information generated in step S203 is represented by class information P that describes which class the processing target block belongs to based on the block evaluation values. The class information P is indicated by a pair of threshold values that define the class. For example, when the evaluation value C1 of the processing target block is higher than T1[5] and lower than T1[6] and when the evaluation value C2 of the processing target block is higher than T2[4] and lower than T2[5], the class of the processing target block is indicated by class R shaded in FIG. 4. The class R shaded in FIG. 4 is expressed as class information P={T1[6], T2[5]}.

Next, how the class determining unit 102 generates class information will be described in detail with reference to the flowchart in FIG. 3. First, the class determining unit 102 initializes a variable i to 1 in step S301 and initializes a variable j to 1 in step S302. Next, the class determining unit 102 in step S303 determines whether the valuation value Ci belongs to a class defined by the threshold value Ti[j]. If it is determined In step S303 that the evaluation value Ci belongs to the class defined by the threshold value Tk[i] (YES in step S303), the processing moves to step S306. If not, the processing moves to step S304. Next, in step S304, the class determining unit 102 adds 1 to the variable j (j=j+1), and the processing moves to step S305.

Next in step S305, the class determining unit 102 determines whether the evaluation value Ci has been compared with all threshold values (all of h threshold values Ti[1] to Ti[h] belonging to the threshold value array Ti) or not. That is, the class determining unit 102 determines whether the variable j is higher than h or not. If so in step S305 (YES in step S305), the processing moves to step S306. If not (NO in step S305), the processing moves to step S303. In step S306, the class determining unit 102 substitutes the threshold value determined as belonging to the evaluation value Ci into class information Pi (ith element of the class information P) on the evaluation value Ci, and the processing moves to step S307. In step S307, the class determining unit 102 adds 1 to the variable i, and the processing moves to step S308.

In step S308, the class determining unit 102 determines whether all of k evaluation values have been compared with the threshold value or not. That is, the class determining unit 102 determines whether the variable i is higher than k or not. If so in step S308 (YES in step S308), the class determining unit 102 ends the class information generation processing. If not (NO in step S308), the class determining unit 102 moves to step S302.

Figure 3:
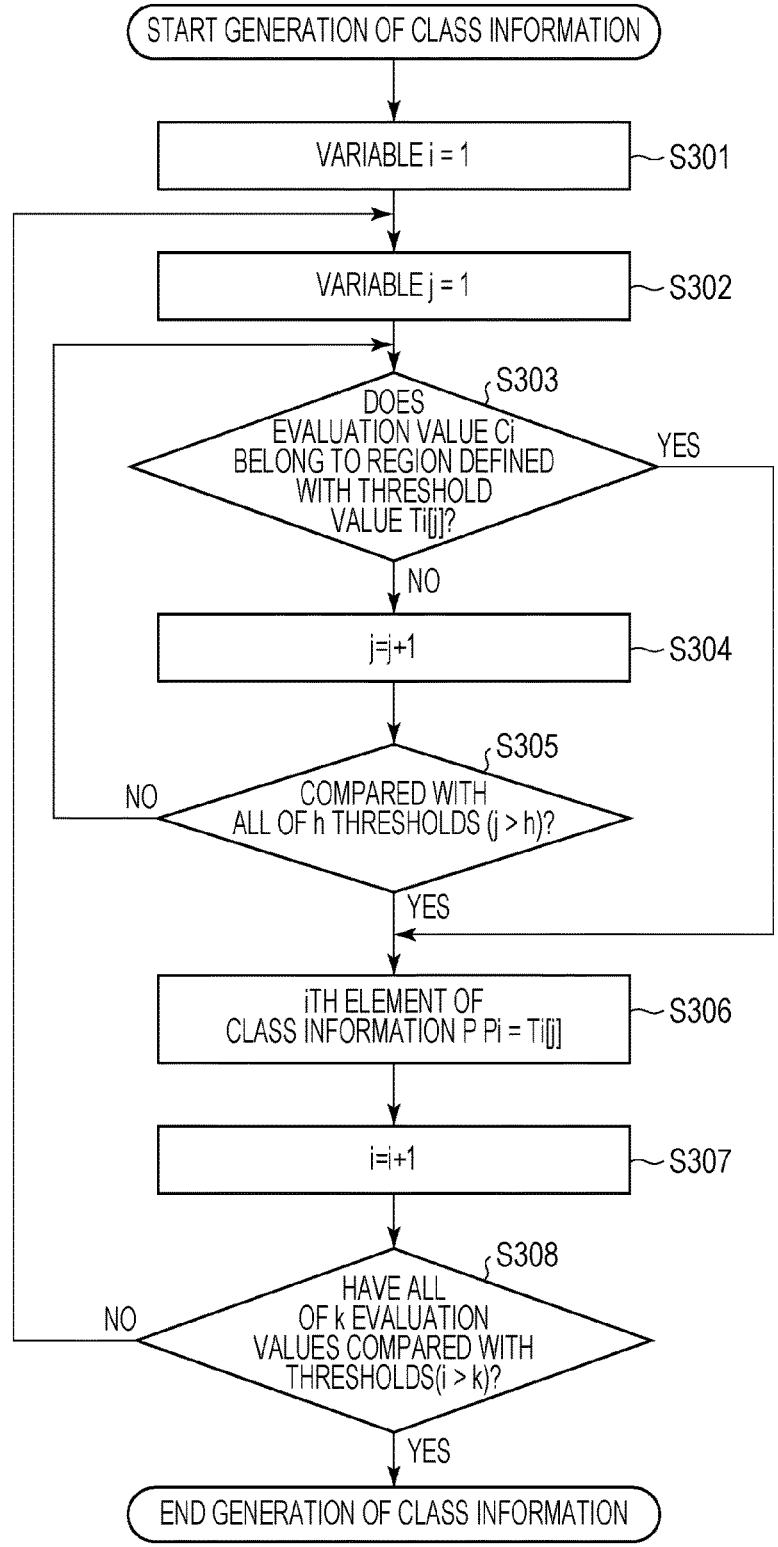
FIG. 3 is a flowchart for generating class information according to the first exemplary embodiment.

The execution of the processing flow illustrated in FIG. 3 allows the class determining unit 102 to generate class information P={P1, P2, . . . , Pk} into which a pair of threshold values determined as belonging to each of the evaluation values is substituted. In a case where two evaluation values are provided, the thus generated class information P={P1, P2} indicates which part of classes illustrated in grid like manner in FIG. 4 the processing target block belongs to. According to this exemplary embodiment, a characteristic of the processing target block and a quantization parameter suitable for the characteristic (hereinafter, called class quantization parameter) are associated with the class information P.

As described above, the class determining unit 102 according to this exemplary embodiment generates the class information P in order to determine a degree of image quality degradation of a processing target block. Then, according to this exemplary embodiment, a complexity of luminance and a mean value of luminance are used as block evaluation values for determining a degree of image quality degradation of a processing target block. The complexity of luminance and mean value of luminance are related to a spatial frequency. An image having a high complexity of luminance and a high mean value of luminance is related to a high spatial frequency while an image having a low complexity of luminance and a low mean value of luminance is related to a low spatial frequency. For example, a human eye has a visual characteristic more sensitive to degradation of image quality of an image having a low spatial frequency than an image having a high spatial frequency. Therefore, a block having a low complexity of luminance has a low spatial frequency, and image quality degradation due to a quantization error is remarkable to the human visual characteristic. On the other hand, a block having a high complexity of luminance has a high spatial frequency, and the image quality degradation is unremarkable. The same is true for mean values of luminance. A block having a low mean value of luminance (or dark block) has a remarkable image quality degradation to the human vision while a block having a high mean value of luminance (or a bright block) has a unremarkable image quality degradation.

Based on those block evaluation values (complexity of luminance and mean value of luminance), a lower left class in FIG. 4, for example, may be determined as a class for a remarkable image quality degradation. Therefore, the quantization parameter control unit 104 according to this exemplary embodiment may lower the class quantization parameter for the lower left class in FIG. 4 to inhibit image quality degradation. The quantization parameter control unit 104 may further increase the class quantization parameter for a class for unremarkable image quality degradation in an upper right part of FIG. 4 to inhibit an increase of the entire amount of code. Thus, the image quality may be improved while keeping an equal bit rate to that in a case where quantization parameter control based on the block evaluation values is not performed.

Returning to the flowchart in FIG. 2, the processing in and after step S204 will be described. In step S204, the counting unit 103 determines whether the processing target block belongs to a class (predetermined class) for unremarkable image quality degradation based on the class information generated in step S203. If it is determined in step S204 that the processing target block belongs to a class (predetermined class) for unremarkable image quality degradation (NO in step S204), the counting unit 103 adds 1 to the count information to update the count information (step S205). On the other hand, if it is determined in step S204 that the processing target block belongs to a class for remarkable image quality degradation (or does not belong to the predetermined class) (YES in step S204), the counting unit 103 moves to step S206.

According to this exemplary embodiment, referring to FIG. 4, a class having a mean value of luminance equal to or higher than a threshold value T1[6] (first predetermined value) and a complexity of luminance equal to or higher than a threshold value T2[6] (second predetermined value) is assumed as a class for an unremarkable image quality degradation. It is assumed that a value of +4 from a quantization parameter being a reference for a frame (hereinafter called reference quantization parameter) is assigned to a class quantization parameter of a class for unremarkable image quality degradation. Values based on difference values from the reference quantization parameter are assigned to all class quantization parameters of the other classes. While the class quantization parameter of the class for unremarkable image quality degradation is a value of +4 from the reference quantization parameter according to this exemplary embodiment, an embodiment of the present invention is not limited thereto. A positive value (or a value higher than the reference quantization parameter) may only be required here. Alternatively, an individual value such as +2, +4, or +6 may be applied to each class.

Next, in step S206, the quantization parameter control unit 104 determines a block quantization parameter. The quantization parameter control unit 104 reads out a corresponding class quantization parameter from class information on the processing target block and sets it as a quantization parameter (block quantization parameter) for the processing target block. It should be noted that the class quantization parameter is updated by step S209. Next, in step S207, the encoding unit 105 encodes the processing target block based on the block quantization parameter determined in step S206 and thus generates an encoded stream.

Next, in step S208, the image encoding apparatus 100 determines whether all blocks within the frame have been encoded or not. If not in step S208 (NO in step S208), the image encoding apparatus 100 returns to step S202 where subsequent blocks are processed. If so in step S208 on the other hand (YES in step S208), the image encoding apparatus 100 moves to step S209. In step S209, the quantization parameter control unit 104 updates the class quantization parameter. The class quantization parameter updated in step S209 is controlled based on count information for one frame generated by the counting unit 103 in step S205 and is applied to the frame to be processed next.

The human visual characteristic for an image largely varies in accordance with the imaging condition and the subject to be imaged. Therefore, the distribution of blocks with respect to the classification as illustrated in FIG. 4 depends on an encoding target image. In order to keep a constant bit rate for a whole frame, it is desirable that the number of blocks belonging to a class for unremarkable image quality degradation (upper right class in FIG. 4) is balanced with the number of blocks belonging to a class for remarkable image quality degradation (lower left class in FIG. 4). In a case where, for example, the number of blocks belonging to a class for unremarkable image quality degradation is low while the number of blocks belonging to a class for remarkable image quality degradation is extremely high, application of an excessively low class quantization parameter to the class for remarkable image quality degradation may disadvantageously increase the bit rate for the whole frame.

In consideration of that, such an increase of the bit rate may be inhibited by counting the number of blocks belonging to a class for unremarkable image quality degradation as count information by the counting unit 103 and controlling the class quantization parameter adaptively based on the count information. More specifically, as the number of blocks belonging to a class for unremarkable image quality degradation decreases, the class quantization parameter for a class for remarkable image quality degradation may be set to a higher value (in a range lower than the class quantization parameter for the class for unremarkable image quality degradation). Thus, balancing the numbers for a whole frame by controlling the class quantization parameter for a class for remarkable image quality degradation may eliminate the necessity for changing the class quantization parameter for a class for unremarkable image quality degradation, which is therefore kept as it is.

FIG. 5 illustrates an example of a method for adjusting a class quantization parameter. When the number of blocks belonging to a class for unremarkable image quality degradation is lower than 1% of a whole frame, the class quantization parameter for the class for unremarkable image quality degradation is equal to +4, and the class quantization parameter for the class for remarkable image quality degradation is set to ±0. When the number of blocks belonging to a class for unremarkable image quality degradation is equal to or higher than 1% and lower than 5% of a whole frame, the class quantization parameter for the class for unremarkable image quality degradation is still equal to +4, and the class quantization parameter for the class for remarkable image quality degradation is set to 0 to −2, and so forth. As the number of blocks belonging to a class for unremarkable image quality degradation increases, the class quantization parameter for the class for remarkable image quality degradation is set to a lower value. It should be noted that the reason why the class quantization parameter for the class for remarkable image quality degradation has a numerical value width of 0 to −2 is because the remarkably may differ even within a class for remarkable image quality degradation and a lower class quantization parameter is assigned to a more remarkable class.

As described above, the image encoding apparatus 100 according to this exemplary embodiment controls a class quantization parameter adaptively based on count information so that the following effects may be acquired. That is, the control of a quantization parameter for assigning appropriate amounts of code to blocks having unremarkable and remarkable degradation of image quality may reduce the required number of memory bits and computational cost compared with a case where the number of blocks of all classes within a frame is counted. According to this exemplary embodiment, the number of blocks belonging to a class for unremarkable image quality degradation may only be required to count as count information. This eliminates the necessity for an additional special memory from a technology in the past which measures the number of blocks of all classes within a frame. Furthermore, according to this exemplary embodiment, a class quantization parameter may be determined without required special calculations based on the number of blocks.

Furthermore, this exemplary embodiment does not require prediction of the number of bits occurring in each frame, unlike technologies in the past. This exemplary embodiment may only require classification of encoded blocks and may thus reduce the computational cost for the classification, though technologies in the past may require classification of macro blocks and classification of sub-blocks of the macro blocks.

Second Exemplary Embodiment

An image encoding apparatus 100 according to a second exemplary embodiment will be described. The configuration of the image encoding apparatus 100 according to this exemplary embodiment is the same as the configuration of the image encoding apparatus 100 according to the first exemplary embodiment illustrated in FIG. 1. The operations of the image encoding apparatus 100 according to this exemplary embodiment are also the same as the operations of the image encoding apparatus 100 according to the first exemplary embodiment illustrated in the flowcharts in FIGS. 2 and 3. Therefore, the description will be omitted.

Figure 6:
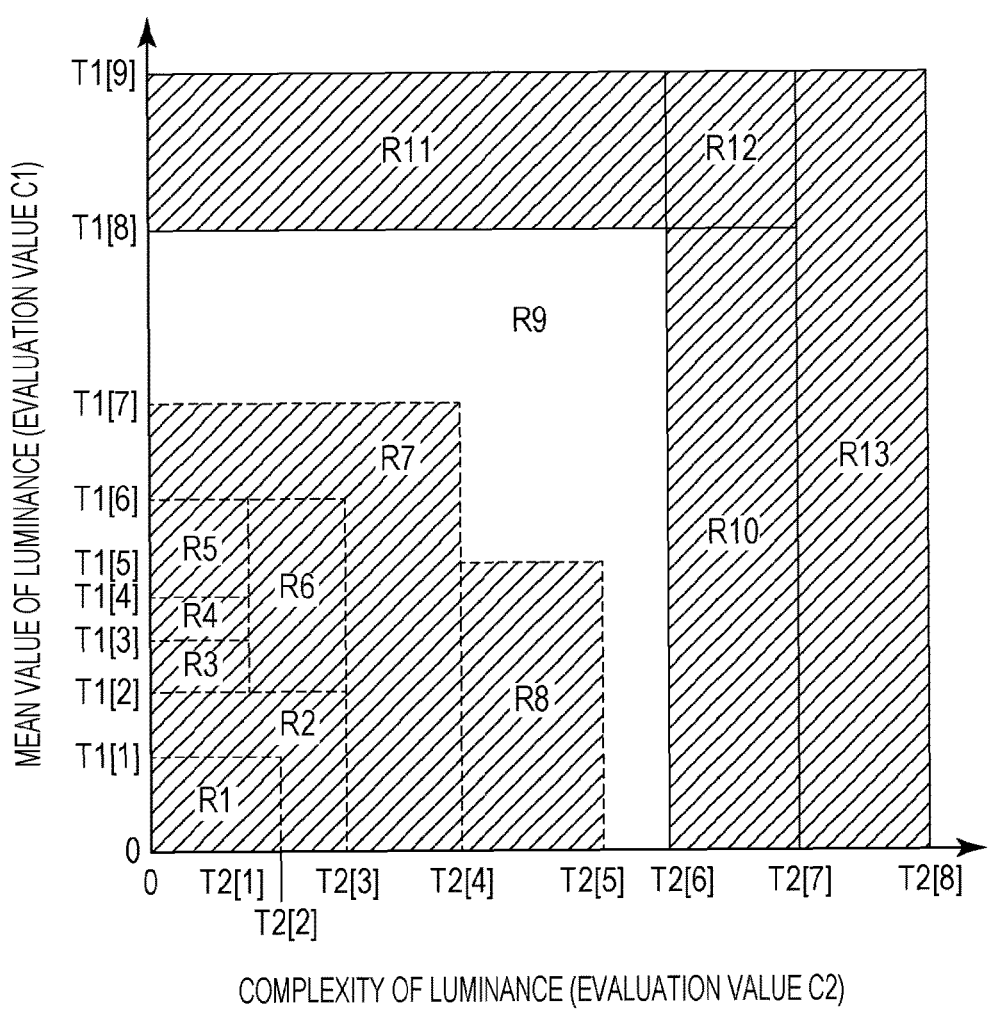
FIG. 6 illustrates identification of a class according to a second exemplary embodiment.

According to this exemplary embodiment, the threshold value array T1 corresponding to the evaluation value C1 and the threshold value array T2 corresponding to the evaluation value C2 are the same as those in the first exemplary embodiment. However, this exemplary embodiment is different from the first exemplary embodiment in that the number of classes is not 72 (FIG. 4) but is 13, {R1, R2, . . . , R13}, as illustrated in FIG. 6, as a block identification result. That is, according to this exemplary embodiment, a plurality of classes (classes divided by the threshold value arrays T1 and T2 in FIG. 4) of the first exemplary embodiment are merged, and a block identification is determined simply by comparison with the corresponding threshold value. Therefore, many processes are simpler than those in the first exemplary embodiment.

More specifically, the determination of 72 classes requires a maximum of 72 comparisons with the threshold values according to the first exemplary embodiment. However, according to this exemplary embodiment, regions R1, R2, . . . , and R13 are sequentially defined as illustrated in FIG. 7 so that 13 classes may be determined by 13 comparison processes at a maximum. While the example according to this exemplary embodiment has been described in which 13 classes are defined, an embodiment of the present invention is not limited thereto. The number of classes may further be increased for detail control over image quality.

Third Exemplary Embodiment

According to the first exemplary embodiment and second exemplary embodiment, the processing units illustrated in FIG. 1 are configured by hardware. However, processes to be performed by the illustrated processing units may be implemented by computer programs.

Figure 8:
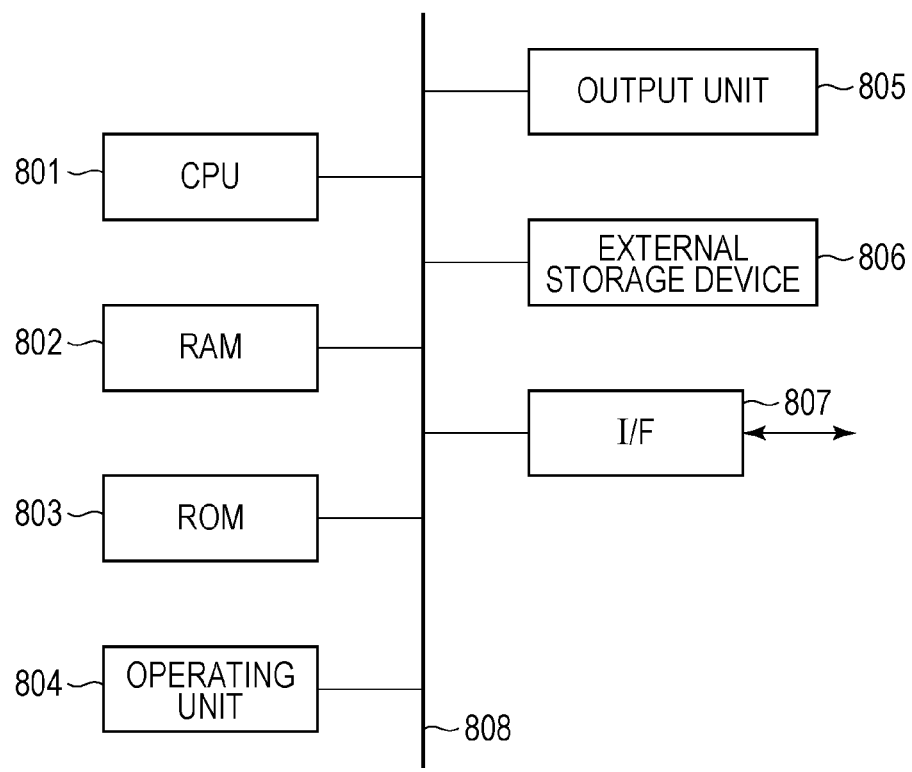
FIG. 8 illustrates a hardware configuration example of a computer to which an image encoding apparatus is applicable.

FIG. 8 illustrates a configuration example of hardware of a computer which executes processes to be performed by the processing units in the image encoding apparatus according to the first exemplary embodiment and second exemplary embodiment.

A CPU 801 generally controls the computer by using a computer program and data stored in a RAM 802 and a ROM 803 and executes the processes as in the image encoding apparatus according to the first and second exemplary embodiments. In other words, the CPU 801 may function as the processing units illustrated in FIG. 1.

The RAM 802 has an area for temporarily storing a computer program and data loaded from an external storage device 806 and data externally acquired through an interface (I/F) 807. The RAM 802 further has a work area usable by the CPU 801 to execute the processes. In other words, the RAM 802 may be assigned as a frame memory, for example, or may provide other areas as required.

The ROM 803 may store setting data and a boot program for the computer, for example.

An operating unit 804 includes a keyboard and a mouse, for example, and may be operated by a user of the computer to input an instruction to the CPU 801.

An output unit 805 displays a processing result from the CPU 801. The output unit 805 may be configured by a liquid crystal display, for example.

An external storage device 806 may be a large capacity information storage device such as a hard disk drive. The external storage device 806 may store an operating system (OS) and other computer programs causing the CPU 801 to implement functions of the processing units illustrated in FIG. 1. The external storage device 806 may further store images to be processed.

The computer program and data stored in the external storage device 806 may be loaded to the RAM 802 under control of the CPU 801 and be processed by the CPU 801.

Networks such as a LAN and the Internet and apparatuses such as a projector and a display apparatus may be connected to the I/F 807, and the computer is allowed to acquire and transmit various information through the I/F 807.

A bus 808 connects the components above.

The operations in this configuration correspond to the operations described with reference to the flowchart and are performed mainly under control of the CPU 801.

Other Exemplary Embodiments

While the image encoding apparatus 100 according to the exemplary embodiments receives a moving image in frames and processes the moving image in raster order in blocks acquired by further dividing the frames, an embodiment of the present invention is not limited thereto. In other words, a moving image may be input in slices acquired by dividing frames, for example.

An embodiment of the present invention is not limited to the aforementioned encoding scheme but may apply other encoding schemes (such as HEVC (High Efficiency Video Coding)) instead of H.264. Having described the size of a processing target block according to the aforementioned exemplary embodiments is 16×16 pixels, an embodiment of the present invention is not limited thereto. For example, it may be 8×8 pixels or 32×32 pixels or may be asymmetrical as 32×16 pixels.

Having described that according to the aforementioned exemplary embodiments, the mean value of luminance and complexity of luminance of a block are used as block evaluation values calculated by the block evaluation value calculating unit 101, an embodiment of the present invention is not limited thereto. In other words, the block evaluation value calculating unit 101 may only require an index which allows determination of the degree of an influence on the human vision for a block evaluation value. For example, the block evaluation value calculating unit 101 may calculate, as a block evaluation value, a variance of luminance, a mean value of chrominance, a complexity of chrominance, a variance of chrominance or the like or may use an index representing an encoding result such as a motion vector and a prediction error. Alternatively, a block evaluation value may be calculated based on information on color phase (hereinafter, called color phase information), or a block evaluation value may be calculated by using a detection result of an object detection or a flesh color (color related to human skin) detection, for example. For example, a block detected as a part (or all) of "Tree" based on its color phase information or a result of an object detection, for example, has a characteristic that its image quality degradation is remarkable in a human vision characteristic. Therefore, the block evaluation value is set to a value that indicates the image quality degradation is remarkable. In this manner, a block evaluation value may be calculated by using color phase information or a detection result of an object detection, for example. A block evaluation value of another block may be used to calculate a block evaluation value of a processing target block. It may only be required that at least one of indices which allow determination of the degree of an influence on the human vision may be used to calculate (acquire) a block evaluation value. Alternatively, a block evaluation value may be calculated based on a plurality of indices.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-255671, filed Dec. 11, 2013, which is hereby incorporated by reference herein in its entirety.

What is claimed is:

1. An image encoding apparatus which encodes an image, the apparatus comprising:
a computer executing instructions that, when executed by the computer, cause the computer to function as:
a first acquiring unit configured to acquire an evaluation value for a block being a division of the image;
a determining unit configured to determine a class to which the block belongs to among a plurality of classes based on the evaluation value acquired by the first acquiring unit;
a second acquiring unit configured to acquire count information describing the number of blocks belonging to a predetermined class of the plurality of classes; and
a setting unit configured to set a quantization parameter usable for encoding a block belonging to a different class from the predetermined class based on the count information acquired by the second acquiring unit.

2. The image encoding apparatus according to claim 1, wherein the second acquiring unit acquires count information describing the number of blocks belonging to the predetermined class based on a visual characteristic.

3. The image encoding apparatus according to claim 1, wherein the first acquiring unit acquires an evaluation value based on a complexity of luminance of the block.

4. The image encoding apparatus according to claim 3, wherein the complexity of luminance of the block is a value determined based on a complexity of sub-blocks being divisions of the block, and the complexity of a sub-block is a total value of magnitudes of differences between luminance values of pixels belonging to the sub-block and a mean value of luminance of the sub-blocks.

5. The image encoding apparatus according to claim 4, wherein the complexity of luminance of the block is a minimum value of complexities of sub-blocks included in the block.

6. The image encoding apparatus according to claim 1, wherein the first acquiring unit acquires an evaluation value based on a mean value of luminance of the block.

7. The image encoding apparatus according to claim 1, wherein the second acquiring unit acquires count information describing the number of blocks belonging to the predetermined class based on a degree of degradation of image quality.

8. The image encoding apparatus according to claim 1, wherein the second acquiring unit acquires count information describing the number of blocks belonging to the predetermined class for an unremarkable degradation of image quality, and the predetermined class is a class having a mean value of luminance of the blocks higher than a first predetermined value and complexities of luminance of the blocks higher than a second predetermined value.

9. The image encoding apparatus according to claim 8, wherein, in a case where the number of blocks belonging to the predetermined class for unremarkable degradation of image quality is higher than a predetermined value, the setting unit sets, based on the count information, a lower quantization parameter for a block not belonging to the predetermined class than a quantization parameter for a block not belonging to the predetermined class in a case where the number of blocks belonging to the predetermined class is lower than the predetermined value.

10. The image encoding apparatus according to claim 8, wherein the setting unit sets, based on the count information, a larger quantization parameter for the block belonging to the predetermined class for unremarkable degradation of image quality than the quantization parameter for blocks belonging to the predetermined class.

11. The image encoding apparatus according to claim 8, wherein, in a case where the number of blocks belonging to the predetermined class for unremarkable degradation of image quality is higher than the predetermined number, the setting unit sets an equal quantization parameter for a block not belonging to the predetermined class but belonging to the class for remarkable degradation of image quality to a quantization parameter for a block belonging to the class for remarkable degradation of image quality in a case where the number of blocks is lower than the predetermined number.

12. The image encoding apparatus according to claim 8, wherein
the first acquiring unit acquires a first evaluation value and a second evaluation value for the block, and
increases of the first evaluation value and the second evaluation value mean that degradation of image quality of the block is more unremarkable when the block is encoded; and
the determining unit determines a class to which the block belongs as the predetermined class for unremarkable degradation of image quality in a case where the first evaluation value of the block is higher than a first threshold value and the second evaluation value of the block is higher than a second threshold value.

13. The image encoding apparatus according to claim 12, wherein the determining unit determines a class to which the block belongs as the class for remarkable degradation of image quality in a case where the first evaluation value of the block is lower than the first threshold value and the second evaluation value of the block is lower than the second threshold value.

14. The image encoding apparatus according to claim 1, wherein the first acquiring unit acquires an evaluation value relating to a visual characteristic of the block.

15. The image encoding apparatus according to claim 1, wherein the setting unit sets a quantization parameter for the block to a preset value in a case where the class determined by the determining unit is the predetermined class.

16. The image encoding apparatus according to claim 1, wherein the evaluation value acquired by the first acquiring unit is information relating to at least one of a complexity or a means value of the block.

17. The image encoding apparatus according to claim 1, wherein the evaluation value acquired by the first acquiring unit is information relating to at least one of information regarding a color phase of the block and information regarding an object detection.

18. The image encoding apparatus according to claim 1, wherein the evaluation value acquired by the first acquiring unit is a value calculated based on evaluation values of sub-blocks being divisions of the block.

19. The image encoding apparatus according to claim 18, wherein the evaluation value acquired by the first acquiring unit is a minimum value of the complexities of sub-blocks belonging to the block.

20. The image encoding apparatus according to claim 13, wherein each of the sub-blocks contains 4☐4 pixels.

21. The image encoding apparatus according to claim 1, the instructions further cause the computer to function as a counting unit configured to count the count information.

22. The image encoding apparatus according to claim 1, the instructions further cause the computer to function as an encoding unit configured to encode the block by using a quantization parameter set by the setting unit.

23. An image encoding method which encodes an image in blocks, the method comprising
  first acquiring an evaluation value for a block being a division of the image;
  determining a class to which the block belongs to among a plurality of classes based on the evaluation value acquired;
  secondly acquiring count information describing the number of blocks belonging to a predetermined class of the plurality of classes; and
  setting a quantization parameter usable for encoding a block belonging to a different class from the predetermined class based on the count information acquired.

24. A non-transitory computer-readable storage medium storing a program for causing a computer to execute encoding, the program comprising:
  computer-executable instructions that encode an image;
  computer-executable instructions that first acquire an evaluation value for a block being a division of the image;
  computer-executable instructions that determine a class to which the block belongs to among a plurality of classes based on the evaluation value acquired;
  computer-executable instructions that secondly acquire count information describing the number of blocks belonging to a predetermined class of the plurality of classes; and
  computer-executable instructions that set a quantization parameter usable for encoding a block belonging to a different class from the predetermined class based on the count information acquired.

* * * * *